United States Patent
Gray et al.

(10) Patent No.: US 10,409,599 B2
(45) Date of Patent: Sep. 10, 2019

(54) DECODING INFORMATION ABOUT A GROUP OF INSTRUCTIONS INCLUDING A SIZE OF THE GROUP OF INSTRUCTIONS

(71) Applicant: Microsoft Technology Licensing, LLC, Redmond, WA (US)

(72) Inventors: Jan Gray, Bellevue, WA (US); Doug Burger, Bellevue, WA (US); Aaron Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 14/752,682

(22) Filed: Jun. 26, 2015

(65) Prior Publication Data

US 2016/0378492 A1 Dec. 29, 2016

(51) Int. Cl.
*G06F 9/30* (2018.01)
*G06F 9/38* (2018.01)

(52) U.S. Cl.
CPC ...... *G06F 9/30101* (2013.01); *G06F 9/30043* (2013.01); *G06F 9/30076* (2013.01);
(Continued)

(58) Field of Classification Search
CPC ............... G06F 9/3802; G06F 9/30043; G06F 9/30145; G06F 9/38; G06F 9/3806;
(Continued)

(56) References Cited

U.S. PATENT DOCUMENTS

| 5,142,631 A | 8/1992 | Murray et al. |
| 5,333,280 A | 7/1994 | Ishikawa et al. |

(Continued)

FOREIGN PATENT DOCUMENTS

| CL | 2017003263 A1 | 6/2018 |
| CN | 102096579 A | 6/2011 |

(Continued)

OTHER PUBLICATIONS

Burger, D et al. Design and Implementation of the TRIPS EDGE Architecture. Jun. 4, 2005. Retrieved from the Internet <URL: https://www.cs.utexas.edu/~trips/talks/trips_tutorial_6up.pdf>.*
(Continued)

*Primary Examiner* — Aimee Li
*Assistant Examiner* — Shawn Doman
(74) *Attorney, Agent, or Firm* — Ranjeev Singh; Singh Law, PLLC

(57) ABSTRACT

A method including fetching a group of instructions, where the group of instructions is configured to execute atomically by a processor is provided. The method further includes decoding at least one of a first instruction or a second instruction, where: (1) decoding the first instruction results in a processing of information about a group of instructions, including information about a size of the group of instructions, and (2) decoding the second instruction results in a processing of at least one of: (a) a reference to a memory location having the information about the group of instructions, including information about the size of the group of instructions or (b) a processor status word having information about the group of instructions, including information about the size of the group of instructions.

20 Claims, 4 Drawing Sheets

(52) U.S. Cl.
CPC ............ *G06F 9/30145* (2013.01); *G06F 9/38* (2013.01); *G06F 9/3802* (2013.01); *G06F 9/3806* (2013.01)

(58) Field of Classification Search
CPC .......... G06F 9/32; G06F 15/80; G06F 9/3005; G06F 9/3842; G06F 9/3822; G06F 9/3836; G06F 9/30054; G06F 9/3804; G06F 9/3846; G06F 9/3859; G06F 9/3891; G06F 9/3808; G06F 9/382; G06F 9/3838; G06F 9/28; G06F 9/3817; G06F 9/322; G06F 9/30061; G06F 9/3851
USPC ................. 712/208, 206, 214, 233
See application file for complete search history.

(56) References Cited

U.S. PATENT DOCUMENTS

| | | |
|---|---|---|
| 5,333,283 A | 7/1994 | Emma et al. |
| 5,363,495 A | 11/1994 | Fry et al. |
| 5,615,350 A | 3/1997 | Hesson et al. |
| 5,790,822 A | 8/1998 | Sheaffer et al. |
| 5,796,997 A | 8/1998 | Lesartre et al. |
| 5,799,167 A | 8/1998 | Lesartre |
| 5,845,102 A | 12/1998 | Miller et al. |
| 5,845,103 A | 12/1998 | Sodani et al. |
| 5,903,750 A | 5/1999 | Yeh et al. |
| 5,933,642 A * | 8/1999 | Greenbaum ............ G06F 8/447 712/1 |
| 5,943,501 A | 8/1999 | Burger et al. |
| 5,983,337 A | 11/1999 | Mahalingaiah et al. |
| 5,999,737 A | 12/1999 | Srivastava |
| 6,016,399 A | 1/2000 | Chang |
| 6,044,222 A | 3/2000 | Simons et al. |
| 6,058,438 A | 5/2000 | Diehl et al. |
| 6,061,776 A | 5/2000 | Burger et al. |
| 6,112,019 A | 8/2000 | Chamdani et al. |
| 6,161,170 A | 12/2000 | Burger et al. |
| 6,164,841 A | 12/2000 | Mattson, Jr. |
| 6,167,491 A | 12/2000 | McAlpine |
| 6,185,675 B1 | 2/2001 | Kranich et al. |
| 6,212,622 B1 | 4/2001 | Witt |
| 6,275,919 B1 | 8/2001 | Johnson |
| 6,279,101 B1 | 8/2001 | Witt et al. |
| 6,286,135 B1 | 9/2001 | Santhanam |
| 6,301,673 B1 | 10/2001 | Foster et al. |
| 6,360,309 B1 | 3/2002 | Iadonato et al. |
| 6,453,344 B1 | 9/2002 | Ellsworth et al. |
| 6,493,820 B2 | 12/2002 | Akkary et al. |
| 6,513,109 B1 | 1/2003 | Gschwind et al. |
| 6,523,110 B1 | 2/2003 | Bright et al. |
| 6,529,922 B1 | 3/2003 | Hoge |
| 6,779,100 B1 | 8/2004 | Keltcher et al. |
| 6,851,043 B1 | 2/2005 | Inoue |
| 6,877,059 B2 | 4/2005 | Solomon et al. |
| 6,918,032 B1 | 7/2005 | Abdallah et al. |
| 6,934,254 B2 | 8/2005 | Brown et al. |
| 6,934,828 B2 | 8/2005 | Parthasarathy et al. |
| 6,957,320 B2 | 10/2005 | Senter et al. |
| 6,957,435 B2 | 10/2005 | Armstrong et al. |
| 6,965,969 B2 | 11/2005 | Burger et al. |
| 6,988,183 B1 | 1/2006 | Wong |
| 6,993,640 B2 | 1/2006 | Doing et al. |
| 6,996,698 B2 | 2/2006 | Slegel et al. |
| 7,032,217 B2 | 4/2006 | Wu |
| 7,036,036 B2 | 4/2006 | Vorbach et al. |
| 7,051,187 B2 | 5/2006 | Garg et al. |
| 7,051,188 B1 | 5/2006 | Kubala et al. |
| 7,152,155 B2 | 12/2006 | McIlvaine et al. |
| 7,207,038 B2 | 4/2007 | Bicsak et al. |
| 7,210,127 B1 | 4/2007 | Rangachari |
| 7,228,402 B2 | 6/2007 | Rychlik et al. |
| 7,284,100 B2 | 10/2007 | Slegel et al. |
| 7,299,458 B2 | 11/2007 | Hammes |
| 7,308,320 B2 | 12/2007 | Miyamori |
| 7,310,722 B2 | 12/2007 | Moy et al. |
| 7,380,038 B2 | 5/2008 | Gray |
| 7,392,524 B2 | 6/2008 | Ault et al. |
| 7,453,899 B1 | 11/2008 | Vaida et al. |
| 7,490,224 B2 | 2/2009 | Abernathy et al. |
| 7,526,637 B2 | 4/2009 | Jung et al. |
| 7,571,284 B1 | 8/2009 | Olson et al. |
| 7,587,578 B2 | 9/2009 | Isobe |
| 7,624,254 B2 | 11/2009 | Smith et al. |
| 7,631,170 B2 | 12/2009 | Dowling |
| 7,664,940 B2 | 2/2010 | Conklin et al. |
| 7,676,650 B2 | 3/2010 | Ukai |
| 7,685,354 B1 | 3/2010 | Hetherington et al. |
| 7,720,991 B1 | 5/2010 | Parent et al. |
| 7,779,213 B2 | 8/2010 | Ferren et al. |
| 7,802,073 B1 | 9/2010 | Cheng et al. |
| 7,805,574 B2 | 9/2010 | Bell, Jr. |
| 7,853,777 B2 | 12/2010 | Jones et al. |
| 7,873,776 B2 | 1/2011 | Hetherington et al. |
| 7,877,580 B2 | 1/2011 | Eickemeyer et al. |
| 7,877,586 B2 | 1/2011 | Levitan et al. |
| 7,917,733 B2 | 3/2011 | Kazuma |
| 7,958,396 B2 | 6/2011 | Chitsaz et al. |
| 8,010,953 B2 | 8/2011 | Gschwind |
| 8,032,734 B2 | 10/2011 | Svendsen et al. |
| 8,055,881 B2 | 11/2011 | Burger et al. |
| 8,055,885 B2 | 11/2011 | Nakashima |
| 8,127,119 B2 | 2/2012 | Burger et al. |
| 8,151,092 B2 | 4/2012 | Altman et al. |
| 8,166,282 B2 | 4/2012 | Madriles et al. |
| 8,180,997 B2 | 5/2012 | Burger et al. |
| 8,201,024 B2 | 6/2012 | Burger et al. |
| 8,225,315 B1 | 7/2012 | Cheng et al. |
| 8,234,635 B2 | 7/2012 | Isshiki et al. |
| 8,250,555 B1 | 8/2012 | Lee et al. |
| 8,250,556 B1 | 8/2012 | Lee et al. |
| 8,266,413 B2 | 9/2012 | Hwu et al. |
| 8,290,994 B2 | 10/2012 | Allalouf et al. |
| 8,321,850 B2 | 11/2012 | Bruening et al. |
| 8,341,639 B2 | 12/2012 | Lewis |
| 8,380,964 B2 | 2/2013 | Bishop et al. |
| 8,433,885 B2 | 4/2013 | Burger et al. |
| 8,434,074 B2 | 4/2013 | Janczak et al. |
| 8,447,911 B2 | 5/2013 | Burger et al. |
| 8,464,002 B2 | 6/2013 | Burger et al. |
| 8,464,271 B2 | 6/2013 | Eichenberger et al. |
| 8,473,724 B1 | 6/2013 | Kenville et al. |
| 8,510,596 B1 | 8/2013 | Gupta et al. |
| 8,533,436 B2 | 9/2013 | Fryman et al. |
| 8,555,038 B2 | 10/2013 | Olson et al. |
| 8,589,662 B2 | 11/2013 | Altman et al. |
| 8,589,892 B2 | 11/2013 | Fournier et al. |
| 8,612,698 B2 | 12/2013 | Lopez et al. |
| 8,612,726 B2 | 12/2013 | Sharawi et al. |
| 8,677,105 B2 | 3/2014 | Abdallah |
| 8,756,605 B2 | 6/2014 | Aingaran et al. |
| 8,817,793 B2 | 8/2014 | Mushano |
| 8,909,941 B1 | 12/2014 | Trimberger |
| 8,930,678 B2 | 1/2015 | Madduri et al. |
| 9,021,241 B2 | 4/2015 | Burger et al. |
| 9,043,769 B2 | 5/2015 | Vorbach |
| 9,053,292 B2 | 6/2015 | Abdallah |
| 9,720,693 B2 | 8/2017 | Burger et al. |
| 9,946,548 B2 | 4/2018 | Burger et al. |
| 9,952,867 B2 | 4/2018 | Burger et al. |
| 2003/0004683 A1 | 1/2003 | Nemawarkar |
| 2003/0012225 A1 | 1/2003 | Banerjee et al. |
| 2003/0065835 A1 | 4/2003 | Maergner et al. |
| 2003/0101208 A1 | 5/2003 | Chauvel et al. |
| 2003/0149862 A1 | 8/2003 | Kadambi |
| 2004/0123078 A1 | 6/2004 | Hum et al. |
| 2004/0139299 A1 | 7/2004 | Busaba et al. |
| 2005/0076194 A1 | 4/2005 | Kanapathippillai et al. |
| 2006/0020769 A1 | 1/2006 | Herrell et al. |
| 2006/0020944 A1 | 1/2006 | King et al. |
| 2006/0031702 A1 | 2/2006 | Jardine et al. |
| 2006/0041875 A1 | 2/2006 | Peri et al. |
| 2006/0075207 A1 | 4/2006 | Togawa et al. |
| 2006/0136915 A1 | 6/2006 | Aingaran et al. |

(56) References Cited

U.S. PATENT DOCUMENTS

| | | |
|---|---|---|
| 2006/0259739 A1 | 11/2006 | Asal et al. |
| 2006/0259740 A1 | 11/2006 | Hahn et al. |
| 2006/0282624 A1 | 12/2006 | Yokota |
| 2007/0050557 A1 | 3/2007 | Ferren et al. |
| 2007/0055827 A1 | 3/2007 | Tsien |
| 2007/0074011 A1 | 3/2007 | Borkar et al. |
| 2007/0113171 A1 | 5/2007 | Behrens et al. |
| 2007/0157006 A1 | 7/2007 | Jourdan et al. |
| 2007/0162906 A1 | 7/2007 | Chandhoke |
| 2007/0192540 A1 | 8/2007 | Gara et al. |
| 2007/0239965 A1 | 10/2007 | Lewites et al. |
| 2007/0255980 A1 | 11/2007 | Endo et al. |
| 2008/0046621 A1 | 2/2008 | Okino et al. |
| 2008/0109668 A1 | 5/2008 | Atkinson |
| 2008/0126750 A1 | 5/2008 | Sistla |
| 2008/0192050 A1 | 8/2008 | Schardt et al. |
| 2008/0235493 A1 | 9/2008 | Fortier |
| 2008/0235499 A1 | 9/2008 | Togawa |
| 2008/0244506 A1 | 10/2008 | Killian et al. |
| 2008/0250227 A1 | 10/2008 | Linderman et al. |
| 2009/0013135 A1 | 1/2009 | Burger et al. |
| 2009/0013153 A1 | 1/2009 | Hilton |
| 2009/0013160 A1 | 1/2009 | Burger et al. |
| 2009/0150657 A1 | 6/2009 | Gschwind et al. |
| 2009/0172365 A1 | 7/2009 | Orenstien et al. |
| 2009/0177843 A1 | 7/2009 | Wallach et al. |
| 2009/0187739 A1 | 7/2009 | Nemirovsky et al. |
| 2009/0228690 A1 | 9/2009 | Muff et al. |
| 2009/0299966 A1 | 12/2009 | Schneider |
| 2010/0070958 A1 | 3/2010 | Takagi |
| 2010/0082947 A1 | 4/2010 | Tramm et al. |
| 2010/0146209 A1 | 6/2010 | Burger et al. |
| 2010/0262807 A1 | 10/2010 | Burky et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0219222 A1 | 9/2011 | Eichenberger et al. |
| 2011/0238953 A1 | 9/2011 | Metsugi et al. |
| 2011/0252258 A1 | 10/2011 | Im et al. |
| 2012/0030451 A1 | 2/2012 | Pong et al. |
| 2012/0079102 A1 | 3/2012 | Damodaran et al. |
| 2012/0124345 A1 | 5/2012 | Denman et al. |
| 2012/0131309 A1 | 5/2012 | Johnson et al. |
| 2012/0216012 A1 | 8/2012 | Vorbach et al. |
| 2012/0246448 A1 | 9/2012 | Abdallah |
| 2012/0246450 A1 | 9/2012 | Abdallah |
| 2012/0303933 A1 | 11/2012 | Manet et al. |
| 2012/0311306 A1 | 12/2012 | Mushano |
| 2013/0024676 A1 | 1/2013 | Glew et al. |
| 2013/0046954 A1 | 2/2013 | Ruehle et al. |
| 2013/0191817 A1 | 7/2013 | Vorbach |
| 2013/0198499 A1 | 8/2013 | Dice et al. |
| 2013/0339470 A1 | 12/2013 | Jeswani et al. |
| 2014/0033217 A1 | 1/2014 | Vajda et al. |
| 2014/0082327 A1 | 3/2014 | Ghose |
| 2014/0095837 A1 | 4/2014 | Plotnikov et al. |
| 2014/0136822 A1 | 5/2014 | Suggs et al. |
| 2014/0173222 A1 | 6/2014 | Alapati et al. |
| 2014/0173262 A1 | 6/2014 | Chheda et al. |
| 2014/0181475 A1 | 6/2014 | Abdallah |
| 2014/0189287 A1 | 7/2014 | Plotnikov et al. |
| 2014/0195787 A1 | 7/2014 | Scalabrino et al. |
| 2014/0201507 A1 | 7/2014 | Jayaseelan et al. |
| 2014/0281389 A1 | 9/2014 | Loktyukhin et al. |
| 2014/0281416 A1 | 9/2014 | Abdallah |
| 2014/0281424 A1 | 9/2014 | Bobba et al. |
| 2014/0281434 A1 | 9/2014 | Madriles et al. |
| 2014/0281435 A1 | 9/2014 | Perkins et al. |
| 2014/0281622 A1 | 9/2014 | Wagh et al. |
| 2014/0282607 A1 | 9/2014 | O'Sullivan et al. |
| 2014/0298336 A1 | 10/2014 | Taniuchi |
| 2014/0317387 A1 | 10/2014 | Abdallah |
| 2014/0331236 A1* | 11/2014 | Mitra ............... G06F 15/7867 718/105 |
| 2014/0351524 A1 | 11/2014 | Natarajan et al. |
| 2014/0372736 A1 | 12/2014 | Greenhalgh |
| 2014/0373022 A1 | 12/2014 | Chan |
| 2015/0019921 A1 | 1/2015 | Chen et al. |
| 2015/0067214 A1 | 3/2015 | Henry et al. |
| 2015/0067662 A1 | 3/2015 | Palalau |
| 2015/0074355 A1 | 3/2015 | Sampathkumar et al. |
| 2015/0095628 A1 | 4/2015 | Yamada et al. |
| 2015/0100757 A1 | 4/2015 | Burger et al. |
| 2015/0127928 A1 | 5/2015 | Burger et al. |
| 2015/0199199 A1 | 7/2015 | Burger et al. |
| 2015/0199272 A1 | 7/2015 | Goel et al. |
| 2015/0347133 A1 | 12/2015 | Gschwind et al. |
| 2015/0347143 A1* | 12/2015 | Godard ............... G06F 9/30149 712/210 |
| 2016/0055004 A1 | 2/2016 | Grochowski et al. |
| 2016/0179546 A1 | 6/2016 | Yamada et al. |
| 2016/0328237 A1 | 11/2016 | Di et al. |
| 2016/0378479 A1 | 12/2016 | Burger et al. |
| 2016/0378483 A1 | 12/2016 | Burger et al. |
| 2016/0378484 A1 | 12/2016 | Burger et al. |
| 2016/0378488 A1 | 12/2016 | Burger et al. |
| 2016/0378491 A1 | 12/2016 | Burger et al. |
| 2016/0378493 A1 | 12/2016 | Burger et al. |
| 2016/0378494 A1 | 12/2016 | Burger et al. |
| 2016/0378499 A1 | 12/2016 | Burger et al. |
| 2016/0378502 A1 | 12/2016 | Burger et al. |
| 2016/0378661 A1 | 12/2016 | Gray et al. |
| 2017/0083343 A1 | 3/2017 | Burger |

FOREIGN PATENT DOCUMENTS

| | | |
|---|---|---|
| CN | 102306094 A | 1/2012 |
| CN | 101344843 A | 1/2014 |
| CN | 104310225 A | 1/2015 |
| EP | 0583089 A2 | 2/1994 |
| EP | 0992894 A1 | 4/2000 |
| EP | 1039374 A2 | 9/2000 |
| EP | 1102163 A2 | 5/2001 |
| EP | 2527972 A2 | 11/2012 |
| WO | 2001025903 A1 | 4/2001 |
| WO | 2004001587 A2 | 12/2003 |
| WO | 2006102664 A2 | 9/2006 |
| WO | 2009006607 A1 | 1/2009 |
| WO | 2011031361 A1 | 3/2011 |
| WO | 2013081556 A1 | 6/2013 |
| WO | 2013095635 A1 | 6/2013 |
| WO | 2014014216 A1 | 1/2014 |
| WO | 2014193878 A1 | 12/2014 |
| WO | 2015069583 A1 | 5/2015 |
| WO | 2016210031 A1 | 12/2016 |

OTHER PUBLICATIONS

Gebhart, et al., "An Evaluation of the TRIPS Computer System", In Proceedings of Fourteenth International Conference on Architectural Support for Programming Languages and Operating Systems, Mar. 7, 2009, 12 pages.

Bakhoda, et al., "Microsoft Research—E2", Published on: Mar. 23, 2015 Available at: http://research.microsoft.com/en-us/projects/e2/.

Putnam, et al., "Dynamic Vectorization in the E2 Dynamic Multicore Architecture", In Proceedings of ACM SIGARCH Computer Architecture News vol. 38, Issue 4, Jan. 14, 2011, 6 pages.

Smith, et al., "Compiling for EDGE Architectures", In Proceedings of the 4th International Symposium on Code Generation and Optimization, Mar. 26, 2006, 11 pages.

Saravana, at al., "TRIPS: A Distributed Explicit Data Graph Execution (EDGE) Microprocessor", In Proceedings of IEEE HotChips Symposium on High-Performance Chips, Aug. 2007, 13 pages.

Maher, et al., "The Good Block: Hardware/Software Design for Composable, Block-Atomic Processors", In Proceedings of the 15th Workshop on Interaction between Compilers and Computer Architectures, Feb. 12, 2011, 8 pages.

Burger, et al., "Scaling to the End of Silicon with EDGE Architectures", In Proceedings of Computer, vol. 37, Issue 7, Jul. 2004, pp. 44-55.

(56) References Cited

OTHER PUBLICATIONS

Smith, Aaron Lee, "Explicit Data Graph Compilation", In Doctoral Dissertation, Dec. 2009, 3 pages.
"International Search Report and Written Opinion Issued in PCT Application No. PCT/US2016/038846", dated Oct. 6, 2016, 11 Pages.
Sankaralingam, et al., "TRIPS: A Polymorphous Architecture for Exploiting ILP, TLP and DLP", In ACM Transactions on Architecture and Code Optimization, vol. 1, Issue 1, Mar. 1, 2004, pp. 62-93.
"International Preliminary Report on Patentability Issued in PCT Patent Application No. PCT/US2016/038846", dated Oct. 9, 2017, 6 Pages.
"Notification of Receipt of Demand Issued in PCT Patent Application No. PCT/US2016/038846", dated Dec. 21, 2016, 1 Page.
"CASH: A C to Layout Compiler", Retrieved from: http://www.cs.cmu.edu/afs/cs/academic/class/15745-s07/www/papers/cash-journal.pdf :, Retrieved on: Apr. 8, 2015, 29 Pages.
"Control Flow Graphs and Loop Optimization", Retrieved from: https://engineering.purdue.edu/~milind/ece573/2011spring/lecture-11.pdf :, Nov. 7, 2014, 38 Pages.
"Explicit Data Graph Execution", Retrieved From: https://en.wikipedia.org/wiki/Explicit_Data_Graph_Execution :, Retrieved on: Jun. 13, 2017, 5 Pages.
"How Many Clock Cycles does a RISCICISC Instruction Take to Execute?", Retrieved from: http://electronics.stackexchange.com/questions/170551/how-many-clock-cycles-does-a-risc-cisc-instruction-take-to-execute :, Retrieved on: Aug. 24, 2015, 5 Pages.
"Intel 64 Architecture Processor Topology Enumeration", In White Paper of Intel, Dec. 13, 2013, 29 Pages.
"Load/store architecture", Retrieved From: https://en.wikipedia.org/wiki/Load/store_architecture, Retrieved Date: Sep. 24, 2015, 1 Page.
"Loop-Invariant Code Motion with Unsafe Operations", Retrieved from : https://web.archive.org/web/20150927030042/https://cs.stackexchange.com/questions/28054/loop-invariant-code-motion-with-unsafe-operations :, Retrieved on: Apr. 9, 2015, 4 Pages.
"Programmatic API for Building Resources", Retrieved From: https://web.archive.org/web/20150706082232/https://jersey.java.net/nonav/documentation/2.0/resource-builder.html :, Nov. 3, 2014, 3 Pages.
"TRIPS (The Tera-op, Reliable, Intelligently adaptive Processing System)", Retrieved from: http://www.cs.utexas.edu/users/cart/trips/, 1 Page.
"Final Office Action Issued in U.S. Appl. No. 14/252,101", dated Jan. 12, 2017, 18 Pages.
"Non-Final Office Action Issued in U.S. Appl. No. 14/252,101", dated Jul. 7, 2016, 18 Pages.
"Non-Final Office Action Issued in U.S. Appl. No. 14/752,356", dated Mar. 21, 2017, 22 Pages.
"Non Final Office Action Issued in U.S. Appl. No. 14/752,418", dated May 18, 2017, 20 Pages.
"Non-Final Office Action Issued in U.S. Appl. No. 14/752,596", dated May 10, 2017, 22 Pages.
"Non Final Office Action Issued in U.S. Appl. No. 14/752,636", dated Apr. 14, 2017, 15 Pages.
"Non Final Office Action Issued in U.S. Appl. No. 14/752,660", dated Apr. 6, 2017, 22 Pages.
"Non-Final Office Action Issued in U.S. Appl. No. 14/752,727", dated Apr. 14, 2017, 11 Pages.
"Non-Final Office Action Issued in U.S. Appl. No. 14/752,797", dated Apr. 18, 2017, 10 Pages.
Aasaraai, et al., "Design Space Exploration of Instruction Schedulers for Out-ofOrder Soft Processors", In Proceedings of the International Conference on Field Programmable Technology, Dec. 8, 2010, 4 Pages.
Abraham, et al., "Predictability of Load/Store Instruction Latencies", In Proceedings of the 26th Annual International Symposium on Microarchitecture, Dec. 1, 1993, pp. 139-152.
Appelbe, et al., "Hoisting Branch Conditions—Improving Super-Scalar Processor Performance, Languages and Compilers for Parallel Computing", In Proceedings of the 8th International Workshop on Languages and Compilers for Parallel Computing, Aug. 10, 1995, 14 Pages.
August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.
Benson, et al., "Design, Integration and Implementation of the DySER Hardware Accelerator", In Proceedings of 18th International Symposium on High Performance Computer Architecture, Feb. 25, 2012, 12 Pages.
Bouwens, et al., "Architecture Enhancements for the AD RES Coarse-Grained Reconfigurable Array", In Proceedings of the 3rd International Conference on High Performance Embedded Architectures and Compilers, Jan. 27, 2008, pp. 66-81.
Budiu, et al., "Optimizing Memory Accesses for Spatial Computation", In Proceedings of 1st International Symposium on Code Generation and Optimization, Mar. 23, 2003, 13 Pages.
Budiu, et al., "Pegasus: An Efficient Intermediate Representation", In Technical Report: CMU-CS-02-107, Apr. 2002, 20 Pages.
Bush, et al., "Evaluation and Optimization of Signal Processing Kernels on the TRIPS Architecture", In Proceedings of 4th Annual Workshop on Optimizations for DSP and Embedded Systems Mar. 2006, 10 Pages.
Bush, Jeff, "Microarchitecture", Retrieved form: https://github.com/jbush001/NyuziProcessor/wiki/Microarchitecture :, Retrieved on Aug. 24, 2015, 7 Pages.
Cain, et al., "Memory Ordering: A Value-Based Approach", In Journal of IEEE Computer Society, vol. 24, Issue 1, Nov. 2004, pp. 110-117.
Carli, Roberto, "Flexible MIPS Soft Processor Architecture", In Technical Report of Massachusetts Institute of Technology, Jun. 16, 2008, pp. 1-49.
Chang, et al., "Cooperative Caching for Chip Multiprocessors", In Proceedings of the 33rd annual international symposium on Computer Architecture Jun. 17, 2006, 12 Pages.
Cheah, et al., "Analysis and Optimization of a Deeply Pipelined FPGA Soft Processor", In Proceedings of International Conference on Field-Programmable Technology, Dec. 10, 2014, 4 Pages.
Chiu, et al., "Hyperscalar: A Novel Dynamically Reconfigurable Multi-core Architecture", In Proceedings of 39th International Conference on Parallel Processing, Sep. 13, 2010, 10 Pages.
Chrysos, et al., "Memory Dependence Prediction using Store Sets", In Proceedings of the 25th Annual International Symposium on Computer Architecture vol. 26, Issue-3, Jun. 1998, pp. 142-153.
Coons, et al., "A Spatial Path Scheduling Algorithm for EDGE Architectures", In Proceedings of 12th International Conference on Architectural Support for Programming Languages and Operating Systems, Oct. 20, 2006, 12 Pages.
Coons, et al., "Feature Selection for Instruction Placement in an EDGE Architecture", Retrieved From: https://pdfs.semanticscholar.org/4c38/8fbe53827627c21a9d2a650395ed4470e544.pdf :, Mar. 17, 2007, 6 Pages.
Cooper, et al., "Loop Invariant Code Motion—Classical Approaches", Retrieved from : http://booksite.elsevier.com/9780120884780/Graduate_Lecture_Slides/Optimizations/23CM-Classic.ppt :, Retrieved Date: Apr. 8, 2015, 19 Pages.
Desikan, et al., "Scalable Selective Re-Execution for EDGE Architectures", In Proceedings of the 11th International conference on Architectural Support for Programming Languages and Operating Systems, Oct. 9, 2004, 13 Pages.
Duong, et al., "Compiler-Assisted, Selective Out-of-Order Commit", In Journal of IEEE Computer Architecture Letters, vol. 12, Issue 1, Jan. 2013, 4 Pages.
Duric, et al., "Dynamic-Vector Execution on a General Purpose EDGE Chip Multiprocessor", In Proceedings of International Conference on Embedded Computer Systems: Architectures, Modeling, and Simulation, Jul. 14, 2014, pp. 18-25.
Duric, et al., "EVX: Vector Execution on Low Power EDGE Cores", In Proceedings of Conference on Design, Automation and Test in Europe Conference and Exhibition, Mar. 24, 2014, 4 Pages.

(56) References Cited

OTHER PUBLICATIONS

Duric, et al., "ReCompac: Reconfigurable Compute Accelerator", In Proceedings of International Conference on Reconfigurable Computing and FPGAs, Dec. 9, 2013, 4 Pages.

Essen, et al., "Energy-Efficient Specialization of Functional Units in a Coarse-Grained Reconfigurable Array", In Proceedings of the 19th ACM/SIGDA International Symposium on Field Programmable Gate Arrays, Feb. 27, 2011, 4 Pages.

Fallin, et al., "The Heterogeneous Block Architecture", In Proceedings of 32nd IEEE International Conference on Computer Design, Oct. 19, 2014, 8 Pages.

Gaudiot, et al., "The Sisal Model of Functional Programming and its Implementation", In Proceedings of Second Aizu International Symposium on Parallel Algorithms/Architectures Synthesis, Mar. 17, 1997, 12 Pages.

Gonzalez, et al., "Dependence Speculative Multithreaded Architecture.", In Technical Report, 1998, 22 Pages.

Wu, et al. "Block Based Fetch Engine for Superscalar Processors", In Proceedingsof the 15th International Conference on Computer Applications in Industry and Engineering, Nov. 7, 2002, 4 Pages.

Xue, et al. "Partial Dead Code Elimination on Predicated Code Regions", In Journal of Software—Practice & Experience, vol. 36, Issue 15, 2004, 32 Pages.

Zmily, et al. "Block-Aware Instruction Set Architecture", In Proceedings of ACM Transactions on Architecture and Code Optimization, vol. 3, Issue 3, Sep. 2006, 31 Pages.

Zmily, et al. "Improving Instruction Delivery with a Block-Aware ISA", In Proceedings of 11th International Euro-Par Conference on Parallel Processing, Aug. 30, 2005, 10 Pages.

Govindan, et al. "Scaling Power and Performance via Processor Composability", In Proceedings of IEEE Transactions on Computers, vol. 63, Issue 8, Aug. 2014, 14 Pages.

Govindaraju, et al. "DySER: Unifying Functionality and Parallelism Specialization for Energy-Efficient Computing", In Proceedings of IEEE Micro vol. 32, Issue 5, Jul. 10, 2012, pp. 38-51.

Gray, et al. "Towards an Area-Efficient Implementation of a High ILP EDGE Soft Processor: Comparing Out-of-Order Dataflow Instruction Scheduler Designs", In Proceedings of the 22nd IEEE International Symposium on Field-Programmable Custom Computing Machines, May 11, 2014, 1 Page.

Gulati, et al. "Multitasking Workload Scheduling on Flexible Core Chip Multiprocessors", In Proceedings of International Conference on Parallel Architectures and Compilation Techniques, Oct. 25, 2008, 10 Pages.

Gupta, Anshuman "Design Decisions for Tiled Architecture Memory Systems", Retrieved from: https://pdfs.semanticscholar.org/9100/c6bbb1f56997b8cad6c1661ee1ce1aa90ee5.pdf :, Sep. 18, 2009, 14 Pages.

Gupta, et al. "Erasing Core Boundaries for Robust and Configurable Performance", In Proceedings of 43rd Annual IEEE/ACM International Symposium on Microarchitecture., Dec. 4, 2010, 12 Pages.

Hammond, et al. "Programming with Transactional Coherence and Consistency (TCC)", In Proceedings of ACM SIGOPS Operating Systems Review. vol. 38, Issue 5., Oct. 7, 2004, 13 Pages.

Hammond, et al. "Transactional Coherence and Consistency: Simplifying Parallel Hardware and Software", In Proceedings of IEEE Computer Society, vol. 24, Issue 6, Nov. 2004, pp. 92-103.

Hammond, et al. "Transactional Memory Coherence and Consistency", In Proceedings of 31st Annual International Symposium on Computer Architecture vol. 32, Issue No. 2, Jun. 19, 2004, 12 Pages.

Hao, et al. "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Hayes, et al. "Unified On-chip Memory Allocation for SIMT Architecture", In Proceedings of the 28th ACM International conference on Supercomputing, Jun. 10, 2014, 10 Pages.

Hruska, Joel "VISC CPU 'virtual core' design emerges: Could this be the conceptual computing breakthrough we've been waiting for?", Retrieved from: https://www.extremetech.com/extreme/192858-visc-cpu-virtual-core-design-emerges-could-this-be-the-conceptual-breakthrough-weve-been-waiting-for, Oct. 24, 2014, 9 Pages.

Huang, et al. "Compiler-Assisted Sub-Block Reuse", In UMSI Research Report, vol. 73, May 2000, 21 Pages.

Ipek, et al. "Core Fusion: Accommodating Software Diversity in Chip Multiprocessors", In Proceedings of the 34th Annual International Symposium on Computer Architecture, Jun. 9, 2007, 12 Pages.

Jhala "Compiler Construction 22nd International Conference", In Proceedings of 22nd International Conference Conferences on Theory and Practice of Software, Mar. 16, 2013, 11 Pages.

Jones, et al. "A Comparison of Data Prefetching on an Access Decoupled and Superscalar Machine", In Proceedings of the Thirtieth Annual IEEE/ACM International Symposium on Microarchitecture, Dec. 3, 1997,6 Pages.

Junier, et al. "Impact of Instruction Cache Replacement Policy on the Tightness of WCET Estimation", In Proceedings of the 2nd Junior Researcher Workshop on Real-Time Computing, in conjunction to RTNS, Oct. 16, 2008, 4 Pages.

Kamaraj, et al. "Design of Out-Of-Order Superscalar Processor with Speculative Thread Level Parallelism", In Proceedings of International Conference on Innovations in Engineering and Technology, Mar. 21, 2014, pp. 1473-1478.

Kane "PA-RISC 2.0 Architecture", in Publication of Prentice Hall PTR, Jan. 1, 1996, 28 Pages.

Kavi, et al. "Concurrency, Synchronization, Speculation—the Dataflow Way", In Journal of Advances in Computers, vol. 96, Nov. 23, 2013, 41 Pages.

Keckler, et al. "Tera-Op Reliable Intelligently Adaptive Processing System (Trips)", In AFRL-IF-WP-TR-2004-1514 (Stinto Final Report), Apr. 2004, 29 Pages.

Kim, et al. "Composable Lightweight Processors", In Proceedings of 40th Annual ACM International Symposium on Microarchitecture, Dec. 1, 2007, pp. 381-393.

Kinsy, et al. "Heracles: A Tool for Fast RTL-Based Design Space Exploration of Multicore Processors", In Proceedings of the ACM/SIGDA International Symposium on Field Programmable Gate Arrays, Feb. 11, 2013, pp. 125-134.

Kocabas, et al. "Enhancing an Embedded Processor Core with a Cryptographic Unit for Performance and Security", In Proceedings of the 4th International Conference on Reconfigurable Computing and FPGAs, Dec. 3, 2008, pp. 409-414.

Kozumplik, et al. "TRIPS to the Semantic EDGE", Retrieved from: https://web.archive.org/web/20150921054006/http://vbn.aau.dk/ws/files/61072300/1212050422.pdf :, Sep. 22, 2015, 28 Pages.

Li, et al. "Code Layout Optimization for Defensiveness and Politeness in Shared Cache", In Proceedings of 43rd International Conference on Parallel Processing, Sep. 9, 2014, 11 Pages.

Li, et al. "Compiler-Assisted Hybrid Operand Communication", In Technical Report TR-09-33, Nov. 1, 2009, 12 Pages.

Li, et al. "Hybrid Operand Communication for Dataflow Processors", In Workshop on Parallel Execution of Sequential Programs on Multi-core Architectures, Jun. 21, 2009, 10 Pages.

Maher, et al. "Merging Head and Tail Duplication for Convergent Hyperblock Formation", In Proceedings of the 39th AnnuaiiEEE/ACM International Symposium on Microarchitecture, Dec. 9, 2006, 12 Pages.

McDonald, et al. "Characterization of TCC on Chip-Multiprocessors", In Proceedings of 14th International Conference on Parallel Architectures and Compilation Techniques., Sep. 17, 2005, 12 Pages.

Mei, Bingfeng, et al. "ADRES: an architecture with tightly coupled VLIW processor and coarse-grained reconfigurable matrix", In Proceedings of 13th International conference on Field-Programmable Logic and Applications, Sep. 9, 2003,10 Pages.

Melvin, et al. "Enhancing Instruction Scheduling with a Block-Structured ISA", In Proceedings of International Journal of Parallel Programming, vol. 23, No. 3,, Jun. 1, 1995,pp. 221-243.

Munshi, et al. "A Parameterizable SIMD Stream Processor", In Proceedings of Canadian Conference on Electrical and Computer Engineering, May 1, 2005, pp. 806-811.

(56) References Cited

OTHER PUBLICATIONS

Muraoka, et al. "VCore-based design methodology", In Proceedings of the Asia and South Pacific Design Automation Conference, Jan. 21, 2003, 5 Pages.
Nagarajan, et al. "A Design Space Evaluation of Grid Processor Architectures", In Proceedings of the 34th Annual IEEE International Symposium on Microarchitecture, Dec. 1, 2001, pp. 40-51.
Nagarajan, et al. "Critical Path Analysis of the TRIPS Architecture", In Proceedings of International Symposium on Performance Analysis of Systems and Software, Mar. 19, 2006, 11 Pages.
Nagarajan, R, et al. "Static Placement dynamic issue (SPDI) scheduling for EDGE architectures.", In Proceedings 13th International Conference on Parallel Architecture and compilation techniques., Sep. 29, 2004, 11 Pages.
"Office Action Issued in Colombian Patent Application No. NC201710013251", dated Jul. 4, 2018, 14 Pages. (W/O English Translation).
"Office Action Issued in Colombian Patent Application No. NC201710013252", dated Jul. 5, 2018, 13 Pages. (W/O English Translation).
"Office Action Issued in Colombian Patent Application No. NC201710013277", dated Jul. 9, 2018, 13 Pages. (W/O English Translation).
Nethercote, et al. "Self-Evaluating Compilation Applied to Loop Unrolling", In Technical Report, TR-06, Feb. 2006, 17 Pages.
Park, et al. "Polymorphic Pipeline Array: A Flexible Multicore Accelerator with Virtualized Execution for Mobile Multimedia Applications", In Proceedings of the 42nd Annual IEEE/ACM International Symposium on Microarchitecture, Dec. 12, 2009, pp. 370-380.
Park, et al. "Reducing Design Complexity of the Load/Store Queue", In Proceedings of the 36th annual IEEE/ ACM International Symposium on Microarchitecture, Dec. 3, 2003, 12 Pages.
"International Preliminary Report on Patentability Issued in PCT Patent Application No. PCT/US2014/039654", dated Aug. 17, 2015, 11 Pages.
"International Search Report & Written Opinion for PCT Patent Application No. PCT/US2014/039654", dated Aug. 26, 2014, 13 Pages.
"Second Written Opinion Issued in PCT Patent Application No. PCT/US2014/039654", dated Mar. 3, 2015, 7 Pages.
"International Search Report and Written Opinion Issued in PCT Application No. PCT/US2016/038842", dated Oct. 6, 2016, 11 Pages.
"International Search Report and Written Opinion Issued in PCT Application No. PCT/US2016/038843", dated Oct. 10, 2016, 11 Pages.
"Second Written Opinion Issued in PCT Application No. PCT/US2016/038846", dated Jul. 4, 2017, 5 Pages.
"International Search Report and Written Opinion Issued in PCT Application No. PCT/US2016/038847", dated Nov. 9, 2016, 10 Pages.
"International Search Report and Written Opinion Issued in PCT Application No. PCT/US2016/038848", dated Oct. 5, 2016, 11 Pages.
"International Search Report and Written Opinion Issued in PCT Application No. PCT/US2016/038849", dated Sep. 30, 2016, 14 Pages.
"International Search Report and Written Opinion Issued in PCT Application No. PCT/US2016/038850", dated Sep. 22, 2016, 12 Pages.
"International Search Report and Written Opinion Issued in PCT Application No. PCT/US2016/038851", dated Sep. 27, 2016, 11 Pages.
"International Search Report and Written opinion issued in PCT Application No. PCT/US2016/038852", dated Sep. 23, 2016, 14 Pages.
"Second Written Opinion Issued in PCT Application No. PCT/US2016/038852", dated May 24, 2017, 5 Pages.
"International Search Report and Written Opinion Issued in PCT Application No. PCT/US2016/038853", dated Sep. 22, 2016, 15 Pages.
"Second Written Opinion Issued in PCT Application No. PCT/US2016/038853", dated May 24, 2017, 6 Pages.
"International Search Report and Written Opinion Issued in PCT Application No. PCT/US2016/038854", dated Sep. 22, 2016, 13 Pages.
"International Search Report and Written Opinion Issued in PCT Application No. PCT/US2016/038855", dated Sep. 27, 2016, 13 Pages.
"Second Written Opinion Issued in PCT Application No. PCT/US2016/038855", dated May 18, 2017, 8 Pages.
"International Search Report and Written Opinion Issued in PCT Application No. PCT/US2016/051209", dated Dec. 16, 2016, 10 Pages.
"International Search Report and Written Opinion Issued in PCT Application No. PCT/US2016/051413", dated Jan. 2, 2017, 16 Pages.
"International Search Report and Written Opinion Issued in PCT Application No. PCT/US2016/051417", dated Dec. 15, 2016, 10 Pages.
Pengfei, et al. "M5 Based EDGE Architecture Modeling", In Proceedings of International Conference on Computer Design, Oct. 3, 2010, pp. 289-296.
Pericas, et al. "A Decoupled KILO-Instruction Processor", In Proceedings of the Twelfth International Symposium on High-Performance Computer Architecture, Feb. 11, 2006, 12 Pages.
Pericas, et al. "A Two-Level Load/Store Queue Based on Execution Locality", In Proceedings of International Symposium on Computer Architecture vol. 36, Issue-3, Jun. 21, 2008, 12 Pages.
Pierce, et al. "Wrong-Path Instruction Prefetching", In Proceedings of the 29th Annual IEEE/ ACM International Symposium on Microarchitecture, Dec. 2, 1996, 17 Pages.
Pricopi, et al. "Bahurupi: A Polymorphic Heterogeneous Multi-Core Architecture", In Proceedings of ACM Transactions on Architecture and Code Optimization , vol. 8, Issue 4, Jan. 1, 2012, 22 Pages.
Rahman, Rezaur "Intel® Xeon Phi Core Micro-Architecture", Retrieved from: https://software.intel.com/en-us/articles/intel-xeon-phi-core-micro-architecture, May 31, 2013, 28 Pages.
Reinman, et al. "Optimizations Enabled by a Decoupled Front-End Architecture", In Proceedings of IEEE Transactions on computers, vol. 50 Issue 4, Apr. 1, 2001, 32 Pages.
Robatmili, et al. "Exploiting Criticality to Reduce Bottlenecks in Distributed Uniprocessors", In Proceedings of 17th IEEE International Symposium on High-Performance Computer Architecture, Feb. 2011, 12 Pages.
Robatmili, et al. "How to Implement Effective Prediction and Forwarding for Fusable Dynamic Multicore Architectures", In Proceedings of IEEE 19th International Symposium on High Performance Computer Architecture, Feb. 23, 2013, 12 Pages.
Robatmili, et al. "Strategies for Mapping Dataflow Blocks to Distributed Hardware", In the proceedings of the 41st IEEE/ACM International Symposium on Microarchitecture, Nov. 8, 2008, pp. 23-34.
Roesner, Franziska"Counting Dependence Predictors", In Undergraduate Honors Thesis Submitted to Department of Computer Sciences, University of Texas at Austin, May 2, 2008, 25 Pages.
Sankaralingam, et al. "Distributed Microarchitectural Protocols in the TRIPS Prototype Processor", In Proceedings of the 39th Annual IEEE/ACM International Symposium on Microarchitecture, Dec. 9, 2006, 12 Pages.
Sankaralingam, et al. "Exploiting ILP, TLP, and DLP with Polymorphous TRIPS Architecture", In Proceedings of 30th Annual International Symposium on Computer Architecture, Jun. 9, 2003, 12 Pages.
Sarkar, et al. "Understanding Power Multiprocessors", In Proceedings of the 32nd ACM SIGPLAN Conference on Programming Language Design and Implementation, Jun. 4, 2011, 12 Pages.
Sethumadhavan, et al. "Design and Implementation of the TRIPS Primary Memory System", In Proceedings of International Conference on Computer Design, ICCD, Oct. 1, 2006, 7 Pages.

(56) References Cited

OTHER PUBLICATIONS

Sethumadhavan, et al. "Late-Binding: Enabling Unordered Load-Store Queues", In Proceedings of the 34th Annual International Symposium on Computer Architecture, Jun. 9, 2007, pp. 347-357.
Sibi, et al. "Scaling Power and Performance via Processor Composability", In Technical Report No. TR-10-14, Department of Computer Sciences, 2010, 20 Pages.
Smith, et al. "Dataflow Predication", In Proceedings of the 39th Annual IEEE/ACM International Symposium on Microarchitecture, Dec. 9, 2006, 12 Pages.
Smith, et al. "TRIPS Application Binary Interface (ABI) Manual", In Technical Report TR-05-22, Department of Computer Sciences, Oct. 10, 2006, 16 Pages.
Sohi, et al. "Multiscalar Processors", In Proceedings of 22nd Annual International Symposium on Computer Architecture, vol. 23, Issue-2, Jun. 22, 1995, 12 Pages.
Sohi, Gurindar "Retrospective: Multiscalar Processors", In Proceedings of the 25th Annual International Symposium on Computer Architectures, Jun. 27, 1998, pp. 111-114.
Souza, et al. "Dynamically Scheduling VLIW Instructions", In Journal of Parallel and Distributed Computing, vol. 60,, Jul. 2000, pp. 1480-1511.
Tamches, et al. "Dynamic Kernel Code Optimization", In Workshop on Binary Translation, Sep. 2001, 10 Pages.
Uhrig, et al. "The Two-dimensional Superscalar GAP Processor Architecture", In Proceedings of International Journal on Advances in Systems and Measurements, vol. 3, Issue 1 & 2,, 2010, pp. 71-81.
Valentine, Bob "Introducing Sandy Bridge", Retrieved from: https://cesga.es/en/paginas/descargaDocumento/id/135, Retrieved on: Aug. 24, 2015, 54 Pages.
Wilhelm, Reinhard "Determining Bounds on Execution Times", In Proceedings of Embedded Systems Design and Verification, vol. 1, Aug. 16, 2005, 33 Pages.
Wong, et al. "Efficient Methods for Out-of-Order Load/Store Execution for High-Performance soft Processors", In Proceedings of International Conference on Field-Programmable Technology, Dec. 9, 2013, pp. 442-445.
"Office Action Issued in European Patent Application No. 16734129.6", dated Dec. 14, 2018, 6 Pages.
Anderson, Michael, "A Framework for Composing High-Performance OpenCL from Python Descriptions", In Technical Report of UCB/EECS-2014-210, Dec. 5, 2014, 144 Pages. (at least pp. 24-58 are relevant).
Choudhury, A.N.M Imroz., "Visualizing Program Memory Behavior Using Memory Reference Traces", In Ph.D. Thesis of University of Utah,, Aug. 2012, 158 Pages. (at least the Abstract on p. 4 of the PDF file is relevant).
Dittmann, Gero, "On Instruction-Set Generation for Specialized Processors", In Dissertation Submitted to the Swiss Federal Institute of Technology Zurich for the Degree of Doctor of Technical Sciences, 2005, 122 Pages. (at least pp. 37-56 are relevant).
Govindan, Madhu Sarava., "E3:Energy-Efficient EDGE Architectures", In Dissertation Presented to the Faculty of Graduate School of the university of Texas in Partial Fulfillment of the Requirements for the Degree of doctor of Philosophy, Aug. 2010, 244 Pages. (at least pp. 1-87 are relevant).
Peon, et al. "HPACK—Header Compression for HTTP/2", Retrieved From: http://tools.ietf.org/html/draft-ietf-httpbis-header-compression-09#p. 8, Jul. 31, 2014, 114 Pages. (at least pp. 8-17 are relevant).
Pickett, Christopher John Francis, "Software Method Level Speculation for Java", In Thesis Submitted to Mcgill University in Partial Fulfillment of the Requirement of the Degree of Doctor of Philosophy, Apr. 2012, 236 Pages. (at least pp. 1-70 are relevant).
Robatmili, Behnam "Efficient Execution of Sequential Applications on Multicore systems", In Dissertation Presented to the Faculty of the Graduate School of the University of Texas at Austin in Partial Fulfillment of the Requirements for the Degree of the Doctor of Philosophy, Aug. 2011, 198 Pages. (at least pp. 1-163 are relevant).
Sankaralingam, Karthikeyan "Polymorphous Architectures: A Unified Approach for Extracting Concurrency of Different Granularities", In Dissertation Presented to the Faculty of the Graduate School of the University of Texas at Austin., Aug. 2007, 276 Pages. (at least pp. 1-217 are relevant).
Huang, Jian "Improving Processor Performance Through Compiler-Assisted Block Reuse", In Dissertation Submitted in Partial Fulfillment of the Requirements for the Degree of Doctor of Philosophy, May 2000, 125 Pages. (at least pp. 1-70 are relevant).
Liu, Haiming "Hardware Techniques to Improve Cache Efficiency", In Dissertation Presented At the Faculty of the Graduate School of the University of Texas at Austin, May 2009, 189 Pages. (at least pp. 77-142 are relevant).
Maher, Bertrand Allen."Atomic Block Formation for Explicit Data Graph Execution Architectures", In Dissertation Presented to the Faculty of the Graduate School of the University of Texas at Austin in Partial Fulfillment of the Requirements for the Degree of Doctor of Philosophy, Aug. 2010, 185 Pages. (at least pp. 1-155 are relevant).
McDonald, et al. "TRIPS Processor Reference Manual, Department of Computer Sciences", In Technical Report TR-05-19, Mar. 10, 2005, 194 Pages. (at least pp. 7-103 and pp. 190-194 are relevant).
Zmily, et al. "Block-Aware Instruction Set Architecture", In Dissertation Submitted to the Department of Electrical Engineering and the Committee on Graduate Studies of Stanford University in Partial Fulfillment of the Requirements for the Degree of Doctor of philosophy, Jun. 2007, 176 Pages. (at least pp. 1-135 are relevant).
"Office Action Issued in Chilean Patent Application No. 201703264", dated Jan. 11, 2019, 7 Pages.
"Office Action Issued in Chilean Patent Application No. 3310-2017", dated Mar. 14, 2019, 9 pages.
"Office Action Issued in European Patent Application No. 16736331.6", dated Jun. 7, 2019, 13 Pages.
Sankaralingam, et al., "Universal Mechanisms for Data-Parallel Architectures", In the Proceedings of the 36th International Symposium on Microarchitecture, Dec. 3, 2003, 12 Pages.
"Office Action Issued In Chilean Patent Application No. 201703318", dated Mar. 26, 2019, 9 Pages.

* cited by examiner

DECODING INFORMATION ABOUT A GROUP OF INSTRUCTIONS INCLUDING A SIZE OF THE GROUP OF INSTRUCTIONS

BACKGROUND

Designers of instruction set architectures (ISAs) and processors make power and performance trade-offs. As an example, if a designer chooses an ISA with instructions that deliver higher performance then the power consumption by the processor may be higher, as well. Alternatively, if the designer chooses an ISA with instructions that consume lower power, then the performance may be lower. The power consumption may be tied to the amount of hardware resources of the processor, such as arithmetic logic units (ALUs), cache lines, or registers, used by the instructions during execution. Use of a large amount of such hardware resources may deliver higher performance at the cost of higher power consumption. Alternatively, the use of a small amount of such hardware resources may result in lower power consumption at the cost of lower performance.

Compilers are used to compile high-level code into instructions compatible with the ISA and the processor architecture.

SUMMARY

In one aspect, a method including, fetching a group of instructions, where the group of instructions is configured to execute atomically by a processor, is provided. The method may further include decoding at least one of a first instruction or a second instruction, where: (1) decoding the first instruction results in a processing of information about the group of instructions, including information about a size of the group of instructions, and (2) decoding the second instruction results in a processing of at least one of: (a) a reference to a memory location having information about the group of instructions, including information about the size of the group of instructions or (b) a processor status word having the information about the group of instructions, including information about the size of the group of instructions.

In another aspect, a method including, fetching a group of instructions, where the group of instructions is configured to execute atomically by a processor, is provided. The method may further include operating the processor in a first mode or a second mode, where operating the processor in the first mode comprises extracting at least a subset of information about the group of instructions from a group header for the group of instructions, including information about a size of the group of instructions. The operating the processor in the second mode may further include at least one of: (1) decoding a first instruction that results in a processing of at least a subset of the information about the group of instructions, including information about the size of the group of instructions, or (2) decoding a second instruction that results in a processing of at least one of: (a) a reference to a memory location having at least a subset of information about the group of instructions, including information about the size of the group of instructions or (b) a processor status word having at least a subset of information about the group of instructions, including information about the size of the group of instructions.

In yet another aspect, a processor including, a front-end control unit for fetching a group of instructions, where the group of instructions is configured to execute atomically by a processor, is provided. The processor may further include an instruction decoder for decoding at least one of the group of instructions to generate information about the group of instructions, where decoding the at least one of the group of instructions includes at least one of: decoding a first instruction that includes information about a size of the group of instructions or (2) decoding a second instruction that includes a reference to a memory location having the information about the size of the group of instructions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
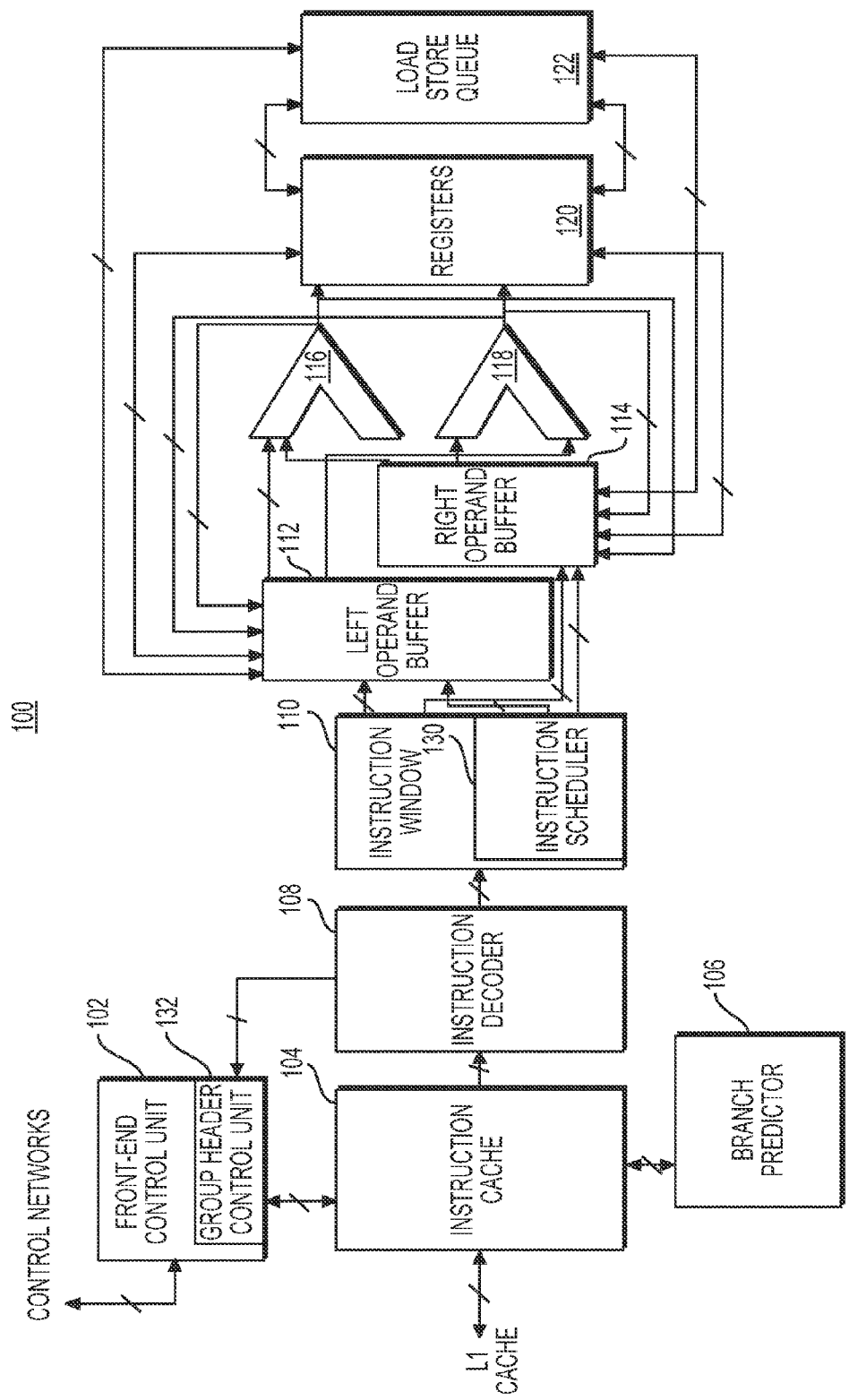
FIG. 1 is a block diagram of a representative processor in accordance with one example.

Examples described in this disclosure relate to instruction set architectures (ISAs) and processors that may have instructions organized in groups, e.g., instruction blocks, that are fetched, executed, and committed atomically. Thus, the processor may fetch the instructions belonging to a single group en masse, map them to the execution resources inside the processor, execute the instructions, and commit their results in an atomic fashion. The processor may either commit the results of all instructions or nullify the execution of the entire group. Instructions inside a group may execute in a data flow order. In addition, the processor may permit the instructions inside a group to communicate directly with each other. An instruction that produces a result may, instead of writing the result to a register file, communicate that result to another instruction that consumes the result. As an example, an instruction that adds the values stored in registers R1 and R2 may be expressed as shown in Table 1:

I[0] READ R1 T[2R];
I[1] READ R2 T[2L];
I[2] ADD T[3L].

In this way, source operands are not specified with the instruction; instead, they are specified by the instructions that target the ADD instruction. The compiler may explicitly encode the control and data dependencies during compilation of the instructions and thereby may free the processor from rediscovering these dependencies at runtime. This may advantageously result in reduced processor load and energy savings during execution of these instructions. As an example, the compiler may use predication to convert all control dependencies into data flow dependencies. Using these techniques, the number of accesses to power hungry register files may be reduced. Table 2, below, shows an example of a general instruction format for such instructions:

| OPCODE | PR | BID | XOP | TARGET1 | TARGET2 |
|--------|----|----|-----|---------|---------|

Each instruction may be of a suitable size, such as 32 bits, 64 bits, or another size. In the example shown in Table 2, each instruction may include an OPCODE field, a PR (predication) field, a BID (broadcast identifier) field, an XOP (extended OPCODE) field, a TARGET1 field, and a TARGET2 field. The OPCODE field may specify a unique operation code for an instruction or a group of instructions, such as add, read, write, or multiply. The PR (predication) field may specify any predication associated with the instruction. As an example, a two bit PR field may be used as follows: 00—not predicated, 01—reserved, 10—predicated on false, and 11—predicated on true. Thus, for example, if an instruction executes only if the result of a comparison is true, then that instruction may be predicated on the result of another instruction that performs the comparison. The BID (broadcast identifier) field may support sending of an operand to any number of consumer instructions in a group. A 2-bit BID field may be used to encode the broadcast channel the instruction receives one of its operands on. The XOP (extended OPCODE) field may support extending the types of opcodes. The TARGET1 and TARGET2 fields may allow up to two target instructions to be encoded. The target field may specify a consumer instruction of the result of the producer instruction, thus permitting direct communication between instructions.

Each group of instructions may have certain information associated with the group of instructions, such as control information and/or meta-information related to the group of instructions. This information may be generated by the compiler during compilation of higher-level code, such as C or C++ into instructions for execution on a processor consistent with the present disclosure. Some of this information may be extracted by the compiler when compiling a group of instructions and examining the nature of the instructions during runtime. Additionally or alternatively, the information associated with the group of instructions may be meta-information concerning the group of instructions. In one example, such information may be provided to a processor using special instructions or instructions that provide target encoding related to registers or other memory that may have the relevant information associated with the group of instructions. In case of special instructions, the opcode field of such instructions may be used to communicate information relating to the group of instructions. In another example, such information may be maintained as part of the processor status word (PSW). In one example, this information may advantageously help the processor execute the group of instructions more efficiently. One example of the types of information that could be provided to the processor using a group header, using special instructions, using memory referenced locations, using the processor status word (PSW), or using a combination of these, is in Table 3 below:

| Type of Information (Fields) | Description |
|---|---|
| ID | This field may be set to 1 to indicate the beginning of a valid group of instructions. It may also include information regarding machine version and architecture version. |
| SIZE | This field may contain the number of 4 instruction chunks contained in a group of instructions. Thus, for example, a value of 00 may indicate the smallest group of instructions in the group, e.g., a group header followed by 4 instructions. A value of 01 may indicate a group header followed by 8 instructions. A value of 10 may indicate a group header followed by 16 instructions. A value of 11 may indicate a group header followed by 32 instructions. This field may encode the size of the group of instructions in other ways. As an example, this field may specify the precise number of instructions in the group, e.g., a group header followed by seven instructions. As another example, this filed may result in the processing of a function by the processor resulting in information about the size. |
| XFLAGS | This field may include flags that indicate special execution requirements for the group of instructions, such as:<br>XFLAGS[0] Vector Mode<br>This flag may indicate that the instructions will be copied into independent vector lanes, each of which may include an instruction window, operand buffers, an ALU, and registers.<br>XFLAGS[1] Inhibit Branch Predictor<br>This flag when set may result in the branch predictor being inhibited. This may prevent the branch predictor from predicting which way a branch will go before this is known for sure.<br>XFLAGS[2] Inhibit Memory Dependence Predictor<br>This flag when set may result in memory dependence being inhibited. This may prevent the memory dependence predictor from predicting dependencies between memory operations, such as load/store operations.<br>XFLAGS[3] Block Synchronization Required<br>This flag when set may impose a requirement that another group of instructions may not be executed on another core in parallel with the current group of instructions. In addition, this flag when set may also impose a requirement that the group of instructions may not execute speculatively.<br>XFLAGS[4] Break After Block |

| Type of Information (Fields) | Description |
|---|---|
| | This flag when set may indicate that there is a break after the group of instructions.<br>XFLAGS[5] Break Before Block<br>This flag when set may indicate that there is break before the group of instructions.<br>XFLAGS[6] Reserved<br>This flag may be reserved for future use.<br>XFLAGS[7] Reserved<br>This flag may be reserved for future use. |
| EXIT TYPES | This field may encode up to six 3-bit group exit types for use by the branch predictor.<br>000 - Null<br>This branch exit type may indicate to the branch predictor that there is no information for the branch predictor in this field.<br>001 - Sequential<br>This branch exit type may indicate to the branch predictor that the next branch is to the next group of instructions in the code. The sequential branch exit type may be computed by factoring in the current address of the group of instructions and the size of the group of instructions, e.g., a current block address and the size of the block.<br>010 - Offset<br>This branch exit type may indicate to the branch predictor that the next branch is to a block relative offset address, where the offset is treated as a group offset.<br>011 - Indirect<br>This branch exit type may indicate to the branch predictor that the next branch is an indirect type. Thus, for example, it may rely on a register of a memory location that contains the address of the beginning of the successor group of instructions.<br>100 - Call<br>This branch exit type may indicate to the branch predictor that if the successor group of instructions contains a subroutine call then the predicted branch goes to that successor group of instructions.<br>101 - Return<br>This branch exit type may indicate to the branch predictor that if the successor group of instructions contains a return from a subroutine call then the predicted branch goes to that successor group of instructions.<br>Other bit patterns may be reserved for future uses. |
| STORE MASK | This field may identify the load-store identifiers (LSIDs) that are assigned to stores. As an example, the LSQ block may have to receive each of the LSIDs assigned to stores for a group of instructions before the group of instructions is allowed to complete. |
| WRITE MASK | This field may identify the global registers that the group of instructions may write. As an example, the register file may have to receive each entry of writes before the group of instructions is allowed to complete. |
| INDEX TO SPECIFICATION | This field may specify an index to an Instruction Set Architecture (ISA) specification. As an example, the ISA specification may include the class of devices that are supported. The class of devices may refer to whether the device is a high-performance device or an Internet-of-Things, mobile devices, wearable devices or other embedded type of device. |
| LOAD/ STORE SPECIFICATION | This field may specify whether the load/store operations associated with the group of instructions are simple or complex. As an example, simple stores may relate to storing committed operand values in disparate memory locations, whereas complex stores may relate to storing committed operand values in shared memory locations. |

While the exemplary group header shown in Table 3 includes many fields, it is merely exemplary. In one embodiment, the compiler may select information for inclusion in a group header or for special instructions that can provide such information to the processor based on the nature of instructions and/or based on the nature of the processing requirements, such as high-performance or low-power. This may advantageously allow better balancing of trade-offs between performance and power consumption. For certain types of processing applications, such as high performance computing with a large number of cores, a large amount of information may be a desirable option. Alternatively, for other types of processing applications, such as embedded processors used in the Internet of Things, mobile devices, wearable devices, or other embedded computing type of applications, less information may be a desirable option. In another aspect, the extent of the information communicated via a group header or special instructions could be tailored depending upon the nature of the instructions in the group of instructions. For example, if the group of instructions includes a loop that is executed several times, then more extensive information might be needed to encapsulate the control information corresponding to the group of instructions. The additional control information may allow the processor to execute the loop more efficiently and thus improve performance. Alternatively, if there is a group of instructions that will be rarely executed, then relatively less information may suffice. In another example, if the group of instructions includes a predicated control loop, then more information may be needed. Similarly, if the group of instructions has an extensive amount of instruction level parallelism, then more information may be needed as part of a group header of via special instructions. The additional control information in the group header or special instructions could be used to effectively exploit the instruction level parallelism in the group of instructions. In another example, if the group of instructions includes several branch instructions, then more information may be needed. The additional control information regarding branch predictions will make the code execution more efficient as it will result in fewer pipeline flushes.

In addition, the functionality corresponding to the fields may be combined or further separated. Similarly, a special instruction may provide information related to any one of the fields in Table 3 or it may combine the information from such fields. As an example, while the exemplary group header of Table 3 includes a separate ID field and an SIZE field, these two fields could be combined into a single field. Similarly, a single special instruction could, when decoded, provide information regarding the size of the group of instructions and the information in the ID field. Unless indicated otherwise, the special instructions may be included anywhere in the group of instructions. As an example, a GROUP_SIZE #size instruction may contain an immediate field (e.g., at least 7 bits) including a value of the size of group of instructions. The immediate field may contain an integer value that provides the size information; alternatively, it may include an encoded value relating to the size information, such that the size information may be obtained by decoding the encoded value. As another example, a GROUP_ID #id special instruction may convey the group ID number. A separate mathematical function or a memory-based table walk may map the group ID into the memory address of a group header. The group ID conveyed as part of this instruction may be unique to each group of instructions. As another example, a GROUP_HDR_ID #id instruction may convey the group header ID number. A separate mathematical function or a memory-based table walk may map the group ID into the memory address of a group header. The group ID conveyed as part of this instruction may be shared by several groups of instructions with the same header structure or fields. As another example, a GROUP_INFO #size, #exit types, #store mask, #write mask instruction may provide information regarding the enumerated fields of the instruction. These fields may correspond to anyone of the fields discussed above with respect to Table 3. Other changes could be made to the group header structure and format and special instructions without departing from the scope of this disclosure. As an example, additional fields that include information relating to the characteristics of the group of instructions could be included. Certain fields might be included based on the frequency of the execution of the group of instructions.

The fields included in the group header structure, or information provided via special instructions or other mechanisms discussed earlier, may be part of a publicly available standard Instruction Set Architecture (ISA) of a particular processor or a family of processors. A subset of the fields may be a proprietary extension to the ISA. Certain bit values in the field may be part of the standard ISA for the processor, but certain other bit values in the field may provide proprietary functionality. This exemplary field could allow an ISA designer to add proprietary extensions to the ISA without disclosing entirely the nature and the functionality associated with the proprietary extension. Thus, in this instance, the compiler distributed by the ISA designer would support the proprietary bit values in the field, an entirely separate proprietary field, or a special instruction. The use of such a field may be particularly relevant to hardware accelerators that are proprietary to certain processor designs. Thus, a program may include a group header field or a special instruction that is unrecognizable; but the program may further include a recipe to decipher the field or decode the instruction.

A suitable compiler may process a group of instructions, configured to execute atomically by a processor, to generate information about the group of instructions, including meta-information and control information about the group of instructions. Some programs may be compiled for only one set of ISA, e.g., an ISA used with processors for Internet of Things, mobile devices, wearable devices, or other embedded computing environments. Compiler may use techniques, such as static code analysis or code profiling to generate the information relevant to the group of instructions. Compiler may consider factors, such as the characteristics of the group of instructions and the frequency of the execution of the group of instructions. The relevant characteristics of the group of instructions, include, but are not limited to: (1) the instruction level parallelism, (2) the number of loops, (3) the number of predicated control instructions, and (4) the number of branch predictions.

One example of a simplified 128 bit group header is shown in Table 4 below:

| 127 | 64 63 | 32 31 | 14 13 | 6 5 | 1 0 |
|---|---|---|---|---|---|
| WRITE MASK | STORE MASK | EXIT TYPES | XFLAGS | SIZE | ID |

One example of an exemplary program in a high-level language and its compilation into groups of instructions, including group headers (with exemplary structure shown in Table 4), is shown below:

Program:

```
int main( ) {
    int a = 1;
    int b = 1;
    int c;
    for (;;) {
        c= a + b;
        if (c >= 100)
            break;
        a = b;
        b = c;
```

```
                }
                return c;
        }
```

Compiled program with groups of instructions and group headers:

```
blk0    header      0, 1, 0, 1, 0, 0, 0
        movi        t3, 1                   ; [0] W[3]
        movi        t4, 2                   ; [1] W[4]
        _write      g3, t3
        _write      g4, t4
        bro         blk1                    ; [2]
blk1    header      1, 0, 0, 10, 0, 24, 0
        read        t3, g3                  ; [0] N[2,0]
        read        t4, g4                  ; [1] N[4,1] N[3,0]
        mov         t5, t3                  ; [2] N[4,0]
        mov         t3, t4                  ; [3] W[3]
        _write      g3, t3
        add         t4, t5, t4              ; [4] N[5,0] W[4]
        _write      g4, t4
        tlei        p0, t4, 99              ; [5] B[1,P]
        bro_t<p0>   blk1                    ; [6] B1
        bro_f<p0>   blk2                    ; [7] B1
blk2
```

In the example above, the groups of instructions include instructions, such as read, mov, and add. The read instruction is used to read values of operands from registers. The mov instruction is used to move or copy operands to one or more targets. The add instruction is used to add the two operands provided as part of this instruction. In addition, there are other instructions that illustrate the conversion of a control loop into predicated data flow instructions. The tlei p0, t4, 99 instruction is a "test less than or equal immediate" instruction. As part of this instruction, the operand value of the instruction is compared with an immediate value (e.g., 99) and if the operand value is less than or equal to the immediate value, then a true value is produced; otherwise, a false value is produced. This predicate (true or false) may be broadcast on a channel and may be received as their first operand by bro_t<p0>blk1 instruction and bro_f<p0> blk2 instruction. The bro_t<p0> blk1 instruction is a "branch with offset" instruction predicated on the result of the tlei instruction being a true value. Similarly, the bro_f<p0> blk2 instruction is a "branch with offset" instruction predicated on the result of the tlei instruction being a false value. Thus, if the result of the tlei instruction is a true value, then the instruction bro_t<p0> blk1 will be executed. Alternatively, if the result of the tlei instruction is a false value, then the bro_f<p0> blk2 will be executed. Any of the fields shown as part of the group headers in the above example may be translated into a special instruction, a memory referenced location, the processor status word (PSW), or a combination of these. Thus, a subset of the control information and/or meta-information may be communicated by the compiler to processor 100 using a group header and another subset of the control information and/or meta-information may be communicated using a special instruction, a memory referenced location, or a program status word.

FIG. 1 is a block diagram of a portion of a representative processor 100 in accordance with one example of the present disclosure. Processor 100 may include a front-end control unit 102, an instruction cache 104, a branch predictor 106, an instruction decoder 108, an instruction window 110, a left operand buffer 112, a right operand buffer 114, an arithmetic logic unit (ALU) 116, an arithmetic logic unit (ALU) 118, registers 120, and a load/store queue 122. In one example, each of the components of processor 100 may be interconnected via data and/or control busses, as shown by lines with arrows connecting the various components. In some instances, the busses may carry only data and instructions; in some instances, the busses may carry only data (e.g., operands); in other instances the busses may carry only control signals, e.g., front-end control unit 102 may communicate, via a bus that carries only control signals, with other control networks. In one example, front-end control unit 102 may include combinational logic and state machines to handle the front end of the processing, including instruction fetch and decode. As an example, front-end control unit 102 may fetch instructions from instruction cache 104 for processing by instruction decoder 108. Front-end control unit 102 may exchange control information with other portions of processor 100 via control networks. Processor 100 may include a single core or multiple cores. In a processor with multiple cores, there may be multiple instances of at least some of the elements shown in FIG. 1. Front-end control unit 102 may coordinate and manage control of various cores and other parts of the processor. Thus, in this example, groups of instructions may be simultaneously executing on multiple cores and front-end control unit 102 may exchange control information via control networks with other cores to ensure synchronization, as needed, for execution of the various groups of instructions. Front-end control unit 102 may fetch and decode a single instruction or multiple instructions per clock cycle. The decoded instructions may be stored in instruction window 110. Instruction window 110 may include an instruction scheduler 130. Instruction scheduler 130 may keep a ready state of each decoded instruction's inputs, e.g., its predication and operands. When all of its inputs (if any) are ready, the instruction may be woken up by instruction scheduler 130 and be ready to issue. When instruction scheduler 130 selects this instruction for issuance it may be issued. Although FIG. 1 shows a certain number of components of processor 100 arranged in a certain manner, there could be more or fewer number of components arranged differently.

Before an instruction is issued, any operands required by the instruction may be stored in left operand buffer 112 and/or right operand buffer 114 (as needed). Depending on the opcode of the instruction, operations may be performed on the operands using ALU 116 and/or ALU 118 or other functional units. The outputs of an ALU may be stored in an operand buffer or stored in one or more registers 120. Store operations that issue in a data flow order may be queued in load/store queue 122 until the group of instruction commits. When the group of instruction commits, load/store queue 122 may write the committed group's stores to a memory. Branch predictor 106 may process information relating to branch exit types from a group header, a special instruction, or a memory referenced location and factor that information in making branch predictions.

With continued reference to FIG. 1, front-end control unit 102 may further include a group header control unit 132. Group header control unit 132 may process control information and/or meta-information for a group of instructions that may be executed atomically. In one example, group header control unit 132 may process group headers for such a group of instructions. As discussed earlier with respect to Table 3 the group header may include control information and/or meta-information regarding the group of instructions. Group header control unit 132 may include combinational logic, state machines, and temporary storage units, such as flip-flops to process the various fields in the group header. In one example, the control information and/or the meta-information for a group of instructions may be obtained by decoding a special instruction. Thus, instruction decoder 108 may receive a special instruction and the output of the decoded special instruction may be provided to group header control unit 132. In one example, a subset of the control and/or the meta-information may be included as part of a group header and another subset of the control and/or meta-information may be obtained by decoding a special instruction.

Figure 2:
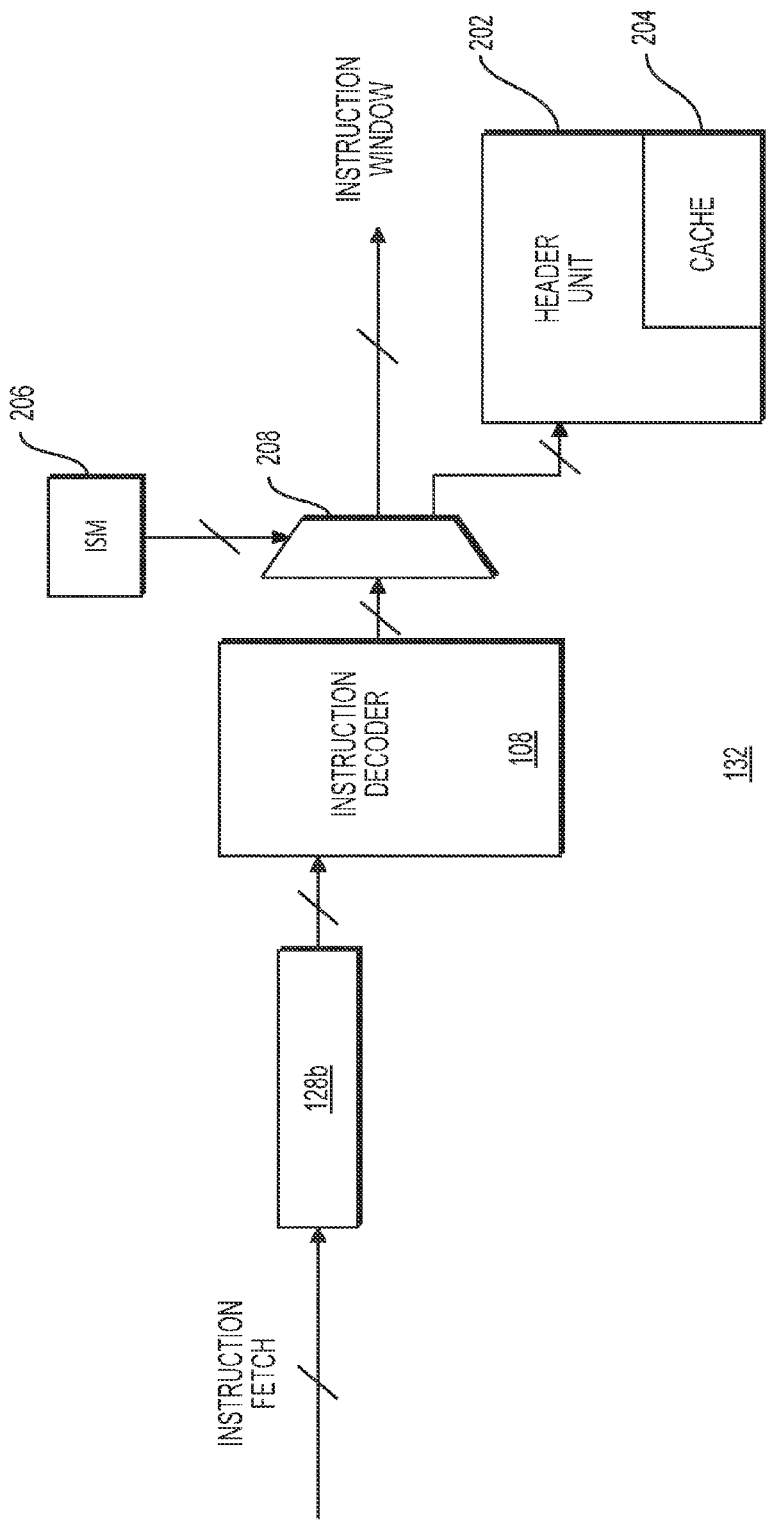
FIG. 2 is a block diagram of a group header control unit in accordance with one example.

FIG. 2 is a block diagram of a group header control unit 132 and its interface with the remaining portions of processor 100 in accordance with one example. Group header control unit 132 may include header unit 202, a cache 204, an instruction state machine (ISM) 206, and a de-multiplexer 208. Front-end control unit 102 may fetch a cache line (e.g., a 128-bit cache line) from L1-cache (or another cache) into instruction cache 104. Fetching may be performed by fetching one byte at a time, eight bytes at a time, or half of a cache-line at a time, or in other quantities. Instruction decoder 108 may decode the cache line and forward the decoded information to de-multiplexer 208. In one example, under the control of ISM 206, the output of de-multiplexer 208 may be provided to instruction window 110 or header unit 202. Thus, for example, if the cache line contains a group header, then the output of de-multiplexer 208 may be provided to header unit 202. Although FIG. 2 shows a de-multiplexer 208 that outputs the group header, there may not be a de-multiplexer. Instead, as an example, there may be two different ports and thus the group header may be fetched on a port different from a port for fetching instructions. In one example relating to a group of instructions with a fixed size (e.g., 32 instructions) the group header will be at the beginning of a group of instructions and thus the initial value of the program counter (PC) will point to the group header. In another example relating to a group of instructions with a variable size (e.g., 32, 64, 96, or 128 instructions), front-end control unit 102 will provide information regarding the size of the group of instructions currently in the instruction window to group header control unit 132. Once group header control unit 132 has this information, it may use it and the PC value to determine the location of the group header. When at least a subset of the control and/or meta-information is provided via a special instruction, then in one example, the last instruction of each group of instructions might be an END_GROUP instruction. As an example, if a group of instructions has sixteen instructions, then the last instruction (e.g., I[15]) may be the END_GROUP instruction. This way instruction decoder will know when it has decoded all of the instructions in the group and thus the entirety of the information required for that group of instructions has been extracted. In other words, after decoding the END_GROUP instruction, the processor will know the size (similar to the SIZE field of Table 3) of the group of instructions that will be executed next. In another example, there may not be an END_GROUP instruction; instead every instruction of a group of instructions may have a field GROUP_ENDS (e.g., a single bit). This single bit when set (or not set) may indicate to the processor that the instruction is the last instruction of the group of instructions. Alternatively, every instruction of the group of instructions may have a field GROUPED_WITH (e.g., a single bit). This single bit when set (or not set) may indicate to the processor that the instruction declares that the next instruction is also part of the same group of instructions. In one example, the single bit may be the first bit of such instructions.

With continued reference to FIG. 2, in one example, header unit 202 may further include cache 204. Cache 204 may be used to store decoded control information and/or meta-information for the group of instructions. Thus, once decoded, such information will not need decoding during the execution of a program. As an example, once group header control 132 receives information that the current group of instructions that is being fetched is the same one that was fetched earlier and decoded, then the control information and meta-information for such a group of instructions could be accessed from cache 204. Thus, for example, branch predictor 106 may receive branch prediction information from cache 204 and similarly load/store queue may receive information regarding load operations or store operations from cache 204. Any of the information shown in Table 3 could be cached when decoded first and later used by processor 100. In one example, each group of instructions may have a unique ID, which could be processed by group header control 132 and the information in cache 204 could be indexed based on this unique ID. Although FIG. 2 shows a certain number of components of group header control unit 132 arranged in a certain manner, there could be more or fewer number of components arranged differently.

Figure 3:
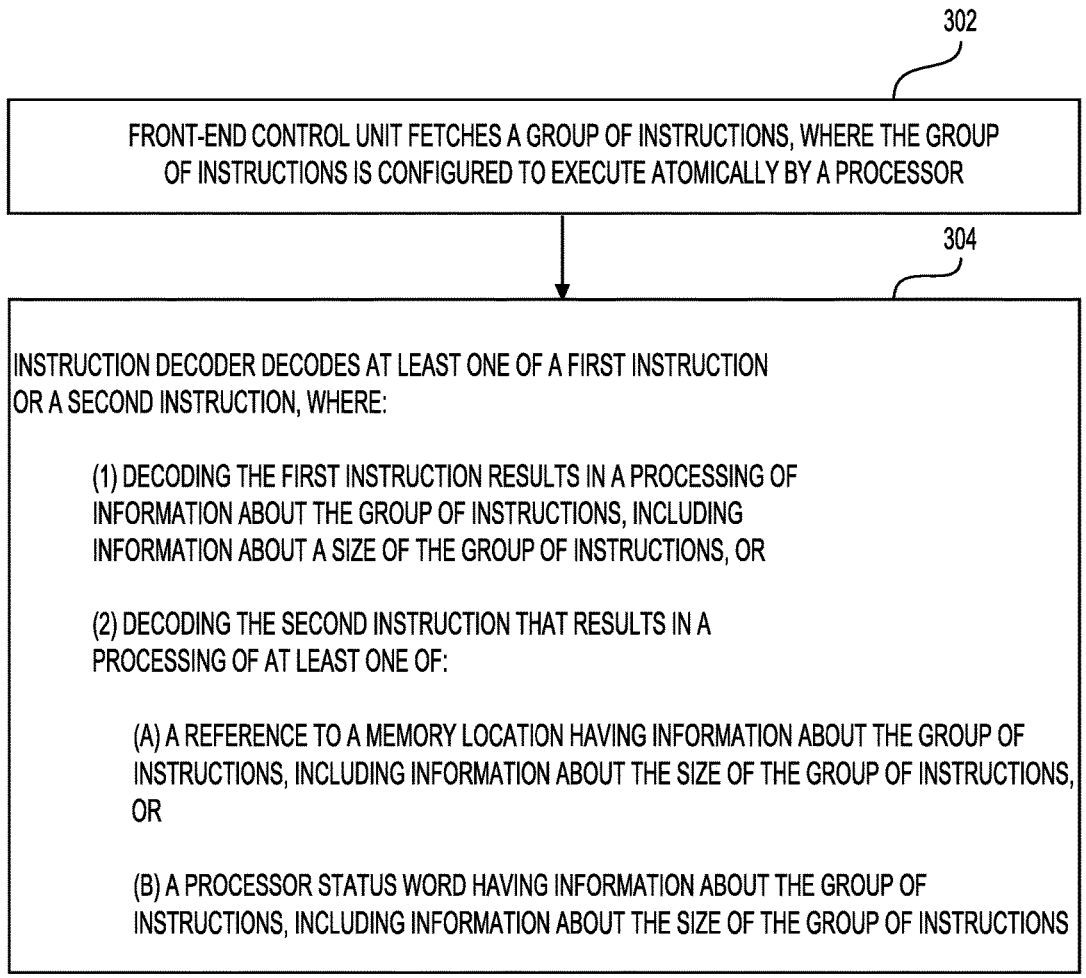
FIG. 3 is a flow diagram of a method in accordance with one example.

FIG. 3 is a flow diagram of a method in accordance with one example. In step 302, as an example, front-end control unit 102 may fetch a group of instructions that are configured to execute atomically by a processor, e.g., processor 100. In this example, no group header may be associated with a group of instructions; instead control information and/or meta-information may be included in a special instruction, a memory referenced location, or a processor status word. As an example, because there is no group header, no size information may be accessible via a field of a group header, such as the SIZE field shown in Table 3. Instead, the last instruction of each group of instructions might be an END_GROUP instruction. As an example, if a group of instructions has sixteen instructions, then the last instruction (e.g., I[15]) may be the END_GROUP instruction. This way instruction decoder will know when it has decoded all of the instructions in the group and thus the entirety of the information required for that group of instructions has been extracted. In other words, after decoding the END_GROUP instruction, the processor will know the size (similar to the SIZE field of Table 3) of the group of instructions that will be executed next. In another example, there may not be an END instruction; instead the first or the last instruction of group of instructions may have a field with a single bit indicating to the processor that the instruction is the first or the last instruction. In one example, the single bit may be the first bit of such an instruction. After the group of instructions has been fetched by front-end control unit 102, the processing may move to step 304.

In step 304, as an example, instruction decoder 108 may decode at least one of a first instruction or a second instruction to generate information about the group of instructions. Instruction decoder 108 may decode at least two types of instructions that are used by a compiler to communicate control information and/or meta-information to processor 100. One instruction may be a special instruction, which when decoded may provide such information, including information about the size of the group of instructions. The information obtained by decoding the special instruction may include any of the information discussed with respect to Table 3. After decoding, the instruction decoder may provide the control information and/or the meta-information to group header control unit 132. A second type of instruction may result in additional processing that may be used to communicate control information and meta-information to processor 100. As an example, as part of this instruction, further processing may include a reference to a memory location with such information, including information about the size of the group of instructions. The reference to a memory location may be a target encoding in the instruction. In another example, further processing may include processing the processor status word to extract such information, including information about the size of the group of instructions. After the control information and/or meta-information is obtained from a memory location or the processor status word, instruction decoder 108 may provide this information to group header control unit 132. Any of the information described in Table 3 may be extracted or processed as part of step 304. As an example, processing in step 304 may include processing branch prediction information for the group of instructions. Step 304 may further include processing load/store queue information for the group of instructions. Step 304 may further include processing an index to at least a portion of an instruction set architecture (ISA). Step 304 may further include processing information regarding a complexity of load operations and store operations in the group of instructions.

Figure 4:
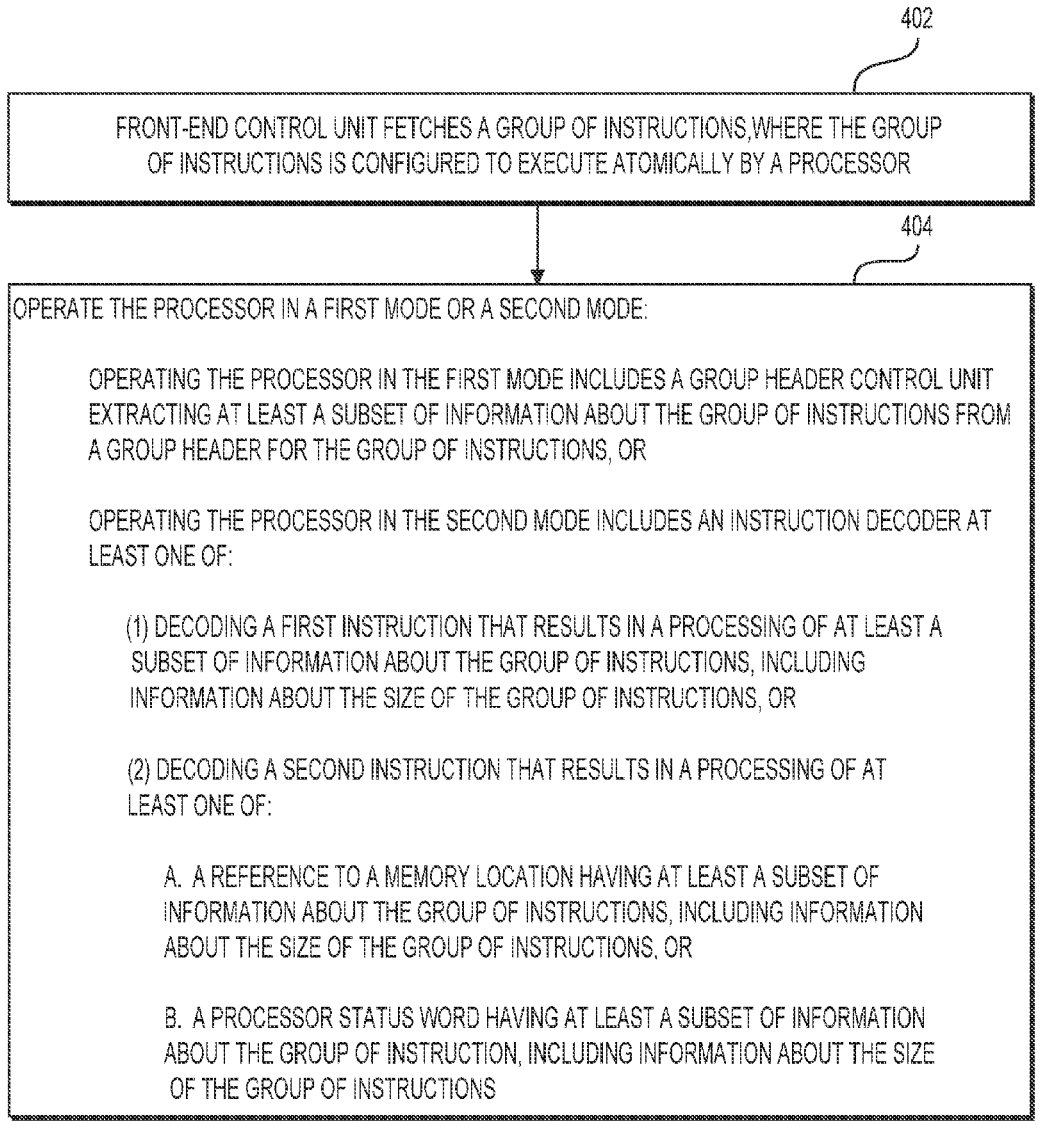
FIG. 4 is a flow diagram of a method in accordance with one example.

FIG. 4 is a flow diagram of a method in accordance with one example. In step 402, as an example, front-end control unit 102 may fetch a group of instructions that are configured to execute atomically by a processor, e.g., processor 100. As shown in step 404, in this example, the processor may be operated in two different modes. In one mode, all of the control information and/or meta-information about the group of instructions may be included in a group header. In the other mode, at least a subset of the control information and/or meta-information about the group of instructions may be included in a group header and at least a subset of the control information and/or meta-information may be included in a special instruction, a memory referenced location, or a processor status word. The size of the subset of the information may range from none to all. A mode bit associated with processor settings may be used to configure the processor in any of these two modes. Operating processor 100 in the first mode may include, processing a field having branch prediction information for the group of instructions. Step 404 may further include processing a field comprising load/store queue information for the group of instructions. Step 404 may further include processing a field having an index to at least a portion of an instruction set architecture (ISA). Step 404 may further include processing a field having information regarding a complexity of load operations and store operations in the group of instructions.

With continued reference to FIG. 4, in the second mode, in step 404, instruction decoder 108 may decode at least two types of instructions that are used by a compiler to communicate control information and/or meta-information to processor 100. One instruction may be a special instruction, which when decoded may provide such information, including information about the size of the group of instructions. A second type of instruction may result in additional processing that may be used to communicate control information and meta-information to processor 100. As an example, as part of this instruction, further processing may include a reference to a memory location with such information, including information about the size of the group of instructions. In another example, further processing may include processing the processor status word to extract such information, including information about the size of the group of instructions. Any of the information described in Table 3 may be extracted or processed as part of this step. As an example, processing in step 404 may include processing branch prediction information for the group of instructions. Step 404 may further include processing load/store queue information for the group of instructions. Step 404 may further include processing an index to at least a portion of an instruction set architecture (ISA). Step 404 may further include processing information regarding a complexity of load operations and store operations in the group of instructions.

In conclusion, method a including, fetching a group of instructions, where the group of instructions is configured to execute atomically by a processor, is provided. The method may further include decoding at least one of a first instruction or a second instruction, where: (1) decoding the first instruction results in a processing of information about the group of instructions, including information about a size of the group of instructions, and (2) decoding the second instruction results in a processing of at least one of: (a) a reference to a memory location having information about the group of instructions, including information about the size of the group of instructions or (b) a processor status word having the information about the group of instructions, including information about the size of the group of instructions. In this method, the information about the group of instructions may include at least one of: (1) control information about the group of instructions, or (2) meta-information about the group of instructions. In addition, in this method, the information about the group of instructions may include at least one of: (1) branch prediction information for the group of instructions, (2) load/store queue information, where the load store information comprises a store mask for the group of instructions, (3) exit types information for the group of instructions, (4) an index to at least a portion of an instruction set architecture for the processor, or (5) information about a complexity of load operations and store operations in the group of instructions.

In addition, a processor including, means for fetching a group of instructions, where the group of instructions is configured to execute atomically by a processor, is provided. The processor may further include means for decoding at least one of the group of instructions to generate information about the group of instructions, where the means for decoding the at least one of the group of instructions includes at least one of: means for decoding a first instruction that includes information about a size of the group of instructions or (2) means for decoding a second instruction that includes a reference to a memory location having the information about the size of the group of instructions. As an example, the means for fetching may be front-end control unit 102 of FIG. 1, and the means for decoding may be instruction decoder 108 of FIG. 1. The processor may further include means for storing decoded information about the size of the group of instructions such that when the group of instructions is fetched again by the means for fetching, the information about the size of the group of instructions is obtained from the cache without decoding the first instruction or the second instruction. As an example, the means for storing decoded information may be cache 204 of FIG. 2. The processor may further include means for receiving branch prediction information about the group of instructions from the instruction decoder or the cache. As an example, the means for receiving branch prediction information may be branch predictor 106 of FIG. 1. The processor may further include means for receiving information regarding load operations or store operations in the group of instructions from the instruction decoder or the cache. As an example, the means for receiving information regarding load operations or store operations may be load store queue 122.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., instruction cache 104 or other types of non-transitory media. The term "non-transitory media" as used herein refers to any media storing data and/or instructions that cause a machine, such as processor 100, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine, such as processor 100. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A processor comprising:
a front-end control unit configured to: (a) fetch a first group of instructions, wherein the first group of instructions is configured to execute atomically by a processor, and (b) fetch a second group of instructions, different from the first group of instructions, wherein the second group of instructions is configured to execute atomically by the processor, and wherein each instruction in the second group of instructions includes a bit whose value is indicative of whether a next instruction fetched by the front-end control unit is a part of the second group of instructions; and
an instruction decoder configured to decode at least one of the first group of instructions to generate information about the first group of instructions, wherein decoding the at least one of the first group of instructions includes decoding a first instruction that includes information: about a size of the first group of instructions, exit types information for the first group of instructions, wherein the exit types information comprises information indicating to a branch predictor whether a next branch is a block relative offset address type or whether a next branch is an indirect exit type, and a store mask comprising a field to identify load-store identifiers that are assigned to stores performed by any of instructions in the first group of instructions.

2. The processor of claim 1 further comprising:
a cache for storing decoded information about the size of the first group of instructions such that when the first group of instructions is fetched again by the front-end control unit, the information about the size of the first group of instructions is obtained from the cache without decoding the first instruction.

3. The processor of claim 2 further comprising the branch predictor for receiving branch prediction information about the first group of instructions from the instruction decoder.

4. The processor of claim 3 further comprising a load/store queue for receiving information regarding load operations in the first group of instructions from the instruction decoder.

5. The processor of claim 1, wherein the first instruction further includes information about whether during execution of the first group of instructions each of the first group of instructions requires independent vector lanes.

6. The processor of claim 1, wherein the first instruction further includes information about whether during execution of the first group of instructions predicting memory dependencies between memory operations is inhibited.

7. The processor of claim 1, wherein the first instruction further includes an index to at least a portion of an instruction set architecture for the processor.

8. The processor of claim 1, wherein the first instruction further includes information about a complexity of load operations and store operations in the first group of instructions.

9. A method comprising:
using a front-end control unit, fetching a first group of instructions, wherein the first group of instructions is configured to execute atomically by a processor, and fetching a second group of instructions, different from the first group of instructions, wherein the second group of instructions is configured to execute atomically by the processor, and wherein each instruction in the second group of instructions includes a bit whose value is indicative of whether a next instruction fetched by the front-end control unit is a part of the second group of instructions; and
using an instruction decoder, decoding at least one of the first group of instructions to generate information about the first group of instructions, wherein decoding the at least one of the first group of instructions includes decoding a first instruction that includes information: about a size of the first group of instructions, exit types information for the first group of instructions, wherein the exit types information comprises information indicating to a branch predictor whether a next branch is a block relative offset address type or whether a next branch is an indirect exit type, and a store mask comprising a field to identify load-store identifiers that are assigned to stores performed by any of instructions in the first group of instructions.

10. The method of claim 9 further comprising:
storing in a cache decoded information about the size of the first group of instructions such that when the first group of instructions is fetched again by the front-end control unit, the information about the size of the first group of instructions is obtained from the cache without decoding the first instruction.

11. The method of claim 9 further comprising the branch predictor receiving branch prediction information about the first group of instructions from the instruction decoder.

12. The method of claim 11 further comprising a load/store queue receiving information regarding load operations in the first group of instructions from the instruction decoder.

13. The method of claim 9, wherein the first instruction further includes information about whether during execution of the first group of instructions predicting memory dependencies between memory operations is inhibited.

14. The method of claim 9, wherein the first instruction further includes an index to at least a portion of an instruction set architecture for the processor.

15. The method of claim 9, wherein the first instruction further includes information about a complexity of load operations and store operations in the first group of instructions.

16. A method comprising:
using a front-end control unit fetching a first group of instructions, wherein the first group of instructions is configured to execute atomically by a processor, and fetching a second group of instructions, different from the first group of instructions, wherein the second group of instructions is configured to execute atomically by the processor, and wherein each instruction in the second group of instructions includes a bit whose value is indicative of whether a next instruction fetched by the front-end control unit is a part of the second group of instructions; and
using an instruction decoder decoding at least one of the first group of instructions to generate information about the first group of instructions, wherein decoding the at least one of the first group of instructions includes decoding a first instruction that includes information: about a size of the first group of instructions, exit types information for the first group of instructions, wherein the exit types information comprises information indicating to a branch predictor whether a next branch is a block relative offset address type or whether a next branch is an indirect exit type, a store mask comprising a field to identify load-store identifiers that are assigned to stores performed by any of instructions in the first group of instructions, and information about whether during execution of the first group of instructions each of the first group of instructions requires independent vector lanes.

17. The method of claim 16 further comprising:
storing in a cache decoded information about the size of the first group of instructions such that when the first group of instructions is fetched again by the front-end control unit, the information about the size of the first group of instructions is obtained from the cache without decoding the first instruction.

18. The method of claim 16 further comprising the branch predictor receiving branch prediction information about the first group of instructions from the instruction decoder.

19. The method of claim 16 further comprising a load/store queue receiving information regarding load operations in the first group of instructions from the instruction decoder.

20. The method of claim 16, wherein the first instruction further includes information about whether during execution of the first group of instructions predicting memory dependencies between memory operations is inhibited.

* * * * *